UNITED STATES PATENT OFFICE 2,288,965

PROCESS FOR THE MANUFACTURE OF SALTS OF CINCHONA ALKALOIDS WITH ASCORBIC ACID

Kurt Warnat, Basel, Switzerland, assignor to Hoffmann-La Roche Inc., Nutley, N. J., a corporation of New Jersey No Drawing. Application November 10, 1939, Serial No. 303,925. In Switzerland December 1, 1938

4 Claims. (Cl. 260—285)

It is known that laevo-ascorbic acid can be prepared by causing alkaline agents to act on esters of gulosonic acid (2-keto-laevo-gulonic acid) and treating the product thus obtained with strong acids.

It has now been found that by the action of cinchona alkaloids on gulosonic esters the salts of cinchona alkaloids with ascorbic acid are obtained. In accordance with the present invention the ascorbates of cinchona alkaloids are prepared by heating esters of gulosonic acid with cinchona alkaloids in suitable solvents. Alcohols, such as, for instance, ethyl-, propyl-, amyl-, isohexyl-alcohol, are suitable solvents. The ascorbates of cinchona alkaloids obtained can be separated in the solid state or may be employed for injection purposes in aqueous solution. The following are suitable cinchona alkaloids for carrying out the present process: Quinine, quinidine, hydroquinine, and hydroquinidine. Access of air should, as far as possible, be avoided during the whole process.

The present process makes it possible to obtain the ascorbic salts of cinchona alkaloids in a simple manner and in good yield. The resulting compounds, which exert the action appertaining to ascorbic acid and quinine bases, are to be used as medicinal preparations.

Example 1

16.2 parts by weight of quinine base are dissolved in 300 parts by weight of isohexyl-alcohol while heating and 10.4 parts by weight of gulosonic acid methyl ester introduced in portions. The liquid is boiled under carbon dioxide for about 10 minutes until it becomes slightly turbid. Then, 100 parts by weight of isohexyl-alcohol are added, whereupon the turbidity disappears. The solution is cooled to 40–50° C. and introduced into 500 parts by weight of ether. The quinine ascorbate precipitates as a light-coloured powder in quantitative yield. It is sucked off, washed with a little ether and dried in vacuo.

Example 2

16.2 parts by weight of quinine are dissolved in 300 parts by weight of hot isohexyl-alcohol. 10.4 parts by weight of gulosonic acid methyl ester are added and boiled until turbidity appears. On cooling, quinine ascorbate crystallises out in fine crystals; it is sucked off, washed with ether and dried. Further quantities can be obtained from the mother liquor by the addition of ether.

Example 3

16.3 parts by weight of hydroquinine are dissolved in 200 parts by weight of hot propyl-alcohol. The solution is boiled for about 1 hour while adding 10.4 parts by weight of gulosonic acid methyl ester in portions. The solution obtained is carefully concentrated to a syrup in vacuo. The residue is taken up in 100 parts by weight of boiled, air-free, water and the solution again evaporated in vacuo. The hydroquinine ascorbate is easily water-soluble. The aqueous solution can directly be used for injection purposes. Since solutions of hydroquinine ascorbate suffer from hydrolysis during storage, it is of advantage to add a little free ascorbic acid to the solutions.

Example 4

16.2 parts by weight of quinine or quinidine are dissolved in 200 parts by weight of absolute ethyl-alcohol while heating. After addition of 10.4 parts by weight of gulosonic acid methyl ester, it is boiled for 2 hours and the reaction product precipitated by the addition of ether.

Example 5

16.2 parts by weight of quinine and 11.1 parts by weight of gulosonic acid ethyl ester are dissolved in 200 parts by weight of ethyl-alcohol. This solution is boiled for 1–2 hours under reflux. The resulting quinine ascorbate can be isolated by evaporation in vacuo or by precipitation of the cooled solution with ether.

I claim:

1. A process for the manufacture of a cinchona alkaloid ascorbate which comprises heating equimolecular proportions of a cinchona alkaloid and an ester of gulosonic acid in an organic solvent.

2. A process for the manufacture of quinine ascorbate which comprises heating equimolecular proportions of quinine and an ester of gulosonic acid in an organic solvent.

3. A process for the manufacture of quinine ascorbate which comprises heating equimolecular proportions of quinine and gulosonic methyl ester in an organic solvent.

4. A process for the manufacture of quinine ascorbate which comprises heating equimolecular proportions of quinine and gulosonic methyl ester in ethyl alcohol, as a solvent.

KURT WARNAT.